(12) United States Patent
Tynderfeldt et al.

(10) Patent No.: US 8,831,034 B2
(45) Date of Patent: Sep. 9, 2014

(54) METHODS AND APPARATUS FOR HANDLING TIME ALIGNMENT IN A CELL WITH EXTENDED CELL RANGE

(75) Inventors: Tobias Tynderfeldt, Solna (SE); Dirk Gerstenberger, Stockholm (SE); Fredrik Huss, Sundbyberg (SE); Daniel Larsson, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 820 days.

(21) Appl. No.: 12/887,704

(22) Filed: Sep. 22, 2010

(65) Prior Publication Data

US 2011/0085491 A1  Apr. 14, 2011

Related U.S. Application Data

(63) Continuation of application No. PCT/SE2010/050949, filed on Sep. 7, 2010.

(60) Provisional application No. 61/250,132, filed on Oct. 9, 2009.

(51) Int. Cl.
*H04J 3/16* (2006.01)

(52) U.S. Cl.
USPC ............ 370/468; 370/232; 370/252; 370/321

(58) Field of Classification Search
None
See application file for complete search history.

(56) References Cited

U.S. PATENT DOCUMENTS

| 6,633,559 | B1* | 10/2003 | Raith et al. ................. 370/350 |
| 6,804,212 | B1 | 10/2004 | Vallstrom |
| 2009/0129329 | A1* | 5/2009 | Usui ............................ 370/329 |
| 2011/0085491 | A1* | 4/2011 | Tynderfeldt et al. .......... 370/315 |

FOREIGN PATENT DOCUMENTS

| GB | 2448889 A | 11/2008 |
| WO | WO 2008105421 A1 * | 9/2008 |
| WO | 2009/061255 A1 | 5/2009 |
| WO | WO 2009061255 A1 * | 5/2009 |

OTHER PUBLICATIONS

English machine translation of WO 2008/105421 A1.*
Ericsson et al., "Introduction of LTE positioning", 3GPP TSG-RAN WG1 Meeting #58, Aug. 24-28, 2009, p. 1, Shenzhen, China, Change Request, R1-093613.
3rd Generation Partnership Project, "Technical Specification Group Radio Access Network; Evolved Universal Terrestrial Radio Access (E-UTRA); Physical Channels and Modulation (Release 8)", 3GPP TS 36.211 V8.8.0, Sep. 2009, pp. 1-83.

* cited by examiner

*Primary Examiner* — Andrew Chriss
*Assistant Examiner* — Salvadore E Rivas
(74) *Attorney, Agent, or Firm* — Coats and Bennett, P.L.L.C.

(57) ABSTRACT

A solution for extending the cell range and in particular for a solution for handling timing alignment is presented herein. The solution comprises determining a distance between user equipment and a radio access network node. User equipment located at a distance related to a pre defined timing advance value is scheduled to handle uplink communication so as to arrive at a later time slot for reducing the risk of conflicting with other transmissions towards the access node.

22 Claims, 11 Drawing Sheets

METHODS AND APPARATUS FOR HANDLING TIME ALIGNMENT IN A CELL WITH EXTENDED CELL RANGE

RELATED APPLICATIONS

This application claims priority under 35 U.S.C. §119 to U.S. Provisional Patent Application Ser. No. 61/250,132, filed Oct. 9, 2009, and to International Application No. PCT/SE2010/050949, filed Sep. 7, 2010, the entire contents of which are incorporated herein by reference.

TECHNICAL FIELD

Example embodiments presented herein relate to a solution for extending the cell range and in particular for a solution for handling timing alignment. Furthermore, the example embodiments relate to a method and an arrangement in a radio network node for controlling uplink transmission from at least one user equipment to arrive time aligned with a time slot structure.

BACKGROUND

LTE (Long Term Evolution) uses OFDM (Orthogonal Frequency Division Multiplexing) in the downlink and DFT-spread OFDM (Discrete Fourier Transform spread Orthogonal Frequency Division Multiplexing) in the uplink. The basic LTE downlink physical resource can thus be seen as a time-frequency grid as illustrated in FIG. 1, where each resource element corresponds to one OFDM subcarrier (e.g., a frequency interval $\Delta f$) during one OFDM symbol interval.

In the time domain, LTE downlink transmissions are organized into radio frames of 10 ms, each radio frame consisting of ten equally-sized subframes of length $T_{subframe}=1$ ms (#0 through #9) as seen in FIG. 2.

Furthermore, the resource allocation in LTE is typically described in terms of resource blocks, as illustrated in FIG. 3. A resource block corresponds to one slot (0.5 ms) in the time domain (illustrated as the horizontal axis of FIG. 3) and 12 contiguous subcarriers in the frequency domain (illustrated as the vertical axis in FIG. 3). Resource blocks are numbered in the frequency domain, starting with 0 from one end of the system bandwidth.

Downlink transmissions are dynamically scheduled, i.e., in each subframe (or transmission time interval, TTI) the base station transmits control information (illustrated as the Control region in FIG. 3) about to which terminals data is transmitted and upon which resource blocks the data is transmitted, in the current downlink subframe. This control signaling is typically transmitted in the first 1, 2, 3 or 4 OFDM symbols in each subframe. The example shown in FIG. 3 includes a downlink system with 3 OFDM symbols as control.

To transmit data in the uplink the mobile terminal has to be assigned an uplink resource for data transmission on the Physical Uplink Shared Channel (PUSCH). In contrast to a data assignment in the downlink, assignments in the uplink must always be consecutive in frequency, to retain the single carrier property of the uplink as illustrated in FIG. 4. In the example shown in FIG. 4, a consecutive range of subcarriers (illustrated as the horizontal axis) is assigned User #1 for one subframe (illustrated as the vertical axis). User #2 has been assigned a larger range of consecutive subcarriers in the same subframe.

The middle SC-FDMA (Single carrier Frequency Division Multiplexing) symbol in each slot is used to transmit a reference signal (illustrated as the darkened blocks in FIG. 4). If the mobile terminal has been assigned an uplink resource for data transmission (illustrated as the clear blocks in FIG. 4) and at the same time instance has control information to transmit, it will transmit the control information together with the data on PUSCH.

Several UEs may be transmitting in the same subframe and transmission from said several UEs may be received simultaneously by an eNB (e.g. a radio access network device or a radio network node). It is desirable to keep the UEs time aligned at the eNB receiver. This preserves orthogonality between users, so that an FFT (Fast Fourier Transform) can be performed over the entire bandwidth in the eNB which will separate the users in frequency domain. It will also reduce complexity in the eNB to use a single FFT for all users.

The Physical Uplink Control Channel (PUCCH) is used for transmitting control information in uplink. The structure of PUCCH is illustrated in FIG. 5. The change in frequency is represented by the vertical axis, while change in time is represented by the horizontal axis. The transmission from the user occupies one physical resource block (illustrated as the darkened block) in each of the two slots in a subframe. Frequency hopping (illustrated as the darkened arrow) is used between the slots to get diversity.

In each physical resource block used for PUCCH, several users may transmit simultaneously. Code multiplexing is used to keep the signals orthogonal within the cell.

If a user need to transmit both data and control information, PUCCH is not used and the control information is instead multiplexed into the data transmission on PUSCH. Otherwise the single carrier property of the uplink signal would not be maintained.

In order to preserve the orthogonality in UL (Uplink), as mentioned above, the UL transmissions from multiple UEs need to be time aligned at the eNB. Since UEs may be located at different distances from the eNB (see FIG. 6), the UEs will need to initiate their UL transmissions at different times, given by a timing advance value. A UE (User Equipment) far from the eNB, e.g., UE2, needs to start transmission earlier than a UE close to the eNB, e.g., UE1. This can for example be handled by time advance of the UL transmissions, a UE starts its UL transmission before a nominal time given by the timing of the DL (Downlink) signal received by the UE. This concept is illustrated in FIG. 7.

In the example provided by FIG. 7, the UL timing alignment is maintained by the eNB (shown as 'eNodeB' in the topmost timeline of FIG. 7) through timing alignment commands, specifying the timing advance value, to the UE based on measurements on UL transmissions from that UE.

Specifically, downlink data (illustrated as blocks with a downward arrow) will first be received by UE1 and later by UE2 since UE1 is located closer to eNodeB, as illustrated in FIG. 6.

Through timing alignment commands, the UE is instructed to start its UL transmissions earlier, the further the distance to the eNB. This applies to all UL transmissions except for random access preamble transmissions on PRACH (Physical Random Access Channel), i.e. including transmissions on both PUSCH and PUCCH.

Specifically, the uplink data (illustrated as blocks with an upward arrow) will be sent at an earlier time by UE2 than UE1 so that the data from both users may arrive at the eNodeB at the same time. Thus, the uplink data from both users (UE1 and UE2) received by the eNodeB is time aligned.

There is a strict relation between DL transmissions and the corresponding UL transmission. Examples of this are:
the timing between a DL-SCH (Downlink Shared Channel) transmission on PDSCH (Physical Downlink Shared Channel) to the HARQ (Hybrid ARQ) ACK/ NACK feedback transmitted in UL (either on PUCCH or PUSCH);

the timing between an UL grant transmission on PDCCH (Physical Downlink Control Channel) to the UL-SCH (Uplink Shared Channel) transmission on PUSCH.

By increasing the timing advance (TA) value for a UE, the UE processing time between the DL transmission and the corresponding UL transmission decreases. For this reason, an upper limit on the maximum timing advance has been defined by 3GPP in order to set a lower limit on the processing time available for a UE. For LTE, this value has been set to roughly 667 us which corresponds to a cell range of 100 km (note that the timing advance value, referred to as TA value, compensates for the round trip delay).

As described above, the maximum TA value allowed by 3GPP limits the range of an LTE cell to 100 km. UL transmissions from UEs at larger distance than 100 km, where the maximum TA value has been reached and exceeded, will therefore not be aligned at the receiver with the UL transmissions of other UEs. This results in that the transmissions from the UE will cause interference towards other users since the UL orthogonality is lost;

separate FFT processing from the other users is required which significantly increases the FFT processing requirements in the eNB receiver.

In WO0111907, there is disclosed a method of operating a time-division multiplexed wireless communications system. A first group of terminals at a first range from base station is instructed to time their transmissions to arrive at a base station in synchronism with a first series of frames. A second group of terminals at a second range is instructed to time their transmissions to arrive at the base station in synchronism with a second series of frames that is time-offset with respect to the first series of frames. Transmissions from the first and second groups of terminals are received at the base station in synchronism with the respective first and second series of frames. The transmissions from respective first and second groups may be received on respective separate carrier frequencies, or may be multiplexed on a common carrier frequency. In cases where the same carrier frequency is used by the first and second series of frames, the intra cell interference may increase.

SUMMARY

The example embodiments presented herein may be used to obviate at least some of the above problems. More particularly, the example embodiments may be used to increase the cell range of a radio network node while maintaining the configuration of the UE.

Some example embodiments may include a method in a radio network node for controlling uplink transmission from at least one user equipment to arrive time aligned with a time slot structure at the radio network node. The time slot structure may be a sequence of time slots, where each time slot may have a time slot period. In an example step, the radio network node receives from said at least one user equipment a timing uplink transmission. Next, the radio network node determines a timing offset based on the timing uplink transmission, wherein the timing offset may be indicative of a distance in time between the radio network node and said at least one user equipment. In a further example step, the radio network node compares the timing offset to a threshold value for determining a timing advance value to be sent to said at least one user equipment. When performing the comparison one of the following steps for setting the timing advance value may be performed. The radio network node sets the timing advance value to the timing offset, when the timing offset is less than the threshold value, whereby a time-aligned uplink transmission from said at least one user equipment may be caused to arrive at the radio network node time aligned with a first uplink time slot. Alternatively, the radio network node sets the timing advance value to the timing offset reduced by one or more time slot periods, when the timing offset is greater than or equal to the threshold value, whereby a time-aligned uplink transmission from said at least one user equipment may be caused to arrive at the radio network node time aligned with a second uplink time slot that is later than the first uplink time slot. Then, the radio network node sends to said at least one user equipment the timing advance value.

Some example embodiments may include an arrangement in a radio network node for controlling uplink transmission from at least one user equipment to arrive time aligned with a time slot structure at the radio network node. The time slot structure may be a sequence of time slots, where each time slot may have a time slot period. The arrangement may comprise a receiving unit that may be configured to receive from said at least one user equipment a timing uplink transmission, and a determining unit that may be configured to determine a timing offset based on the timing uplink transmission. The timing offset may be indicative of distance in time between the radio network node and said at least one user equipment. Furthermore, the arrangement may comprise a comparing unit that may be configured to compare the timing offset to a threshold value for determining a timing advance value to be sent to said at least one user equipment. The comparing unit may further be configured to set the timing advance value to the timing offset, when the timing offset is less than the threshold value, whereby a time-aligned uplink transmission from said at least one user equipment may be caused to arrive at the radio network node time aligned with a first uplink time slot, or to set the timing advance value to the timing offset reduced by one or more time slot periods, when the timing offset is greater than or equal to the threshold value, whereby a time-aligned uplink transmission from said at least one user equipment may be caused to arrive at the radio network node time aligned with a second uplink time slot that is later than the first uplink time slot. The arrangement may further comprise a sending unit that may be configured to send to said at least one user equipment the timing advance value.

Because a comparison of the timing offset to a threshold value is performed, it is possible to determine a timing advance value to be sent to said at least one user equipment. If the timing offset is greater than or equal to the threshold value (which may be the case for UEs far away, for example 100 km or more, from the radio network node), the radio network node may set the timing advance value to the timing offset reduced by one or more time slot periods. In this manner, a time-aligned uplink transmission from said at least one user equipment is caused to arrive at the radio network node time aligned with the second uplink time slot that is later than the first uplink time slot. As a result, the cell range of a radio network node is increased, while maintaining the configuration of the UE.

Advantageously, the example embodiments allows for cell ranges exceeding, for example, 100 km at a reasonable complexity increase in the radio network node. This is achieved without introducing more stringent processing requirements on the UEs or changes to the HARQ timing relations between UL and DL.

BRIEF DESCRIPTION OF THE DRAWINGS

In the following the example embodiments will be described in a non-limiting way and in more detail with reference to exemplary embodiments illustrated in the enclosed drawings, in which.

DETAILED DESCRIPTION

Figure 1:
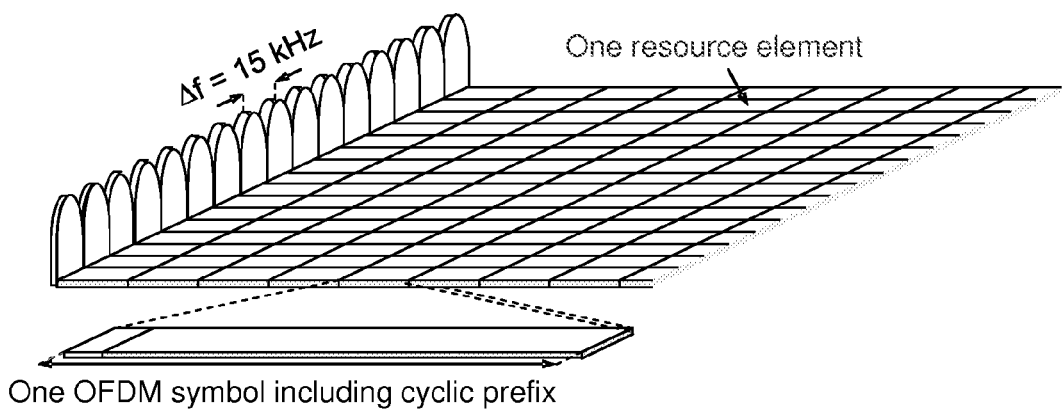
FIG. 1 illustrates schematically an LTE downlink physical resource.
Figure 2:
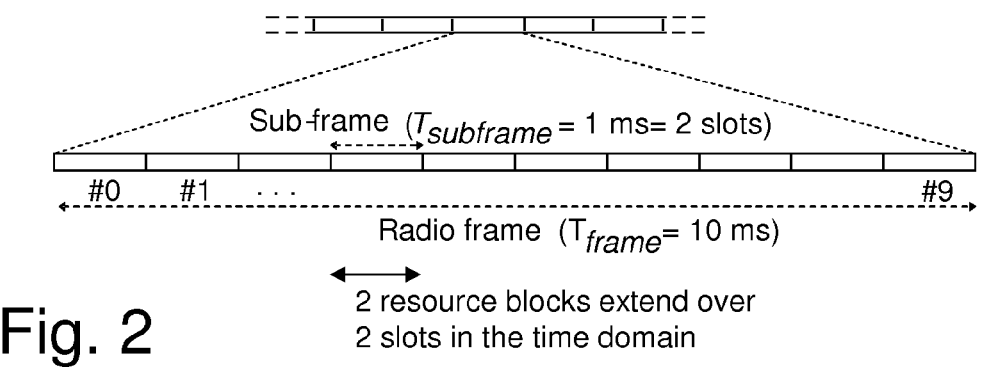
FIG. 2 illustrates schematically an LTE time-domain structure.
Figure 3:
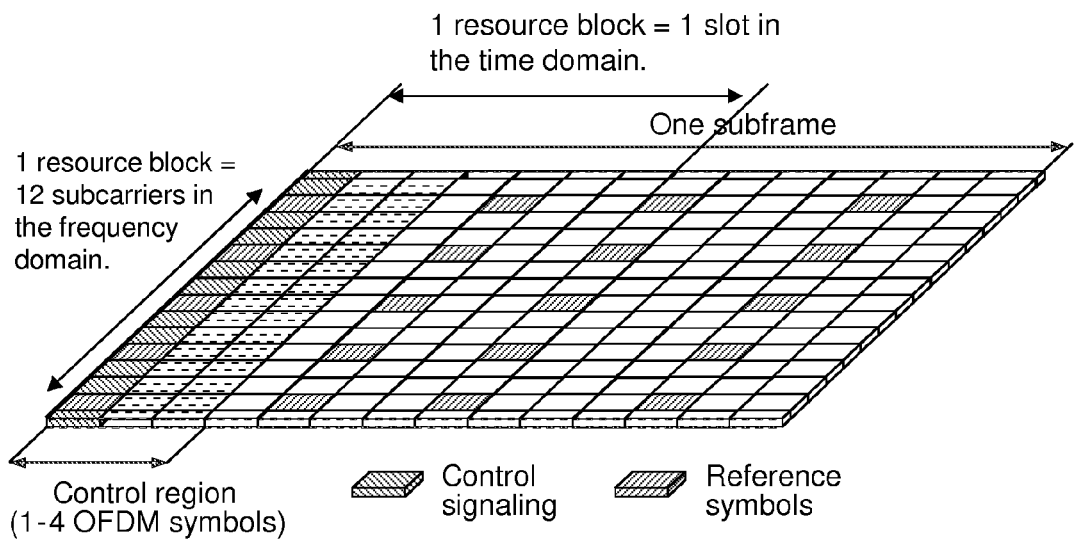
FIG. 3 illustrates schematically a Downlink subframe.
Figure 4:
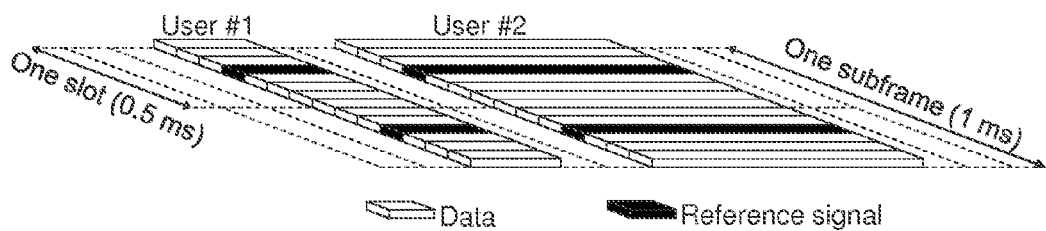
FIG. 4 illustrates schematically a PUSCH resource assignment.
Figure 5:
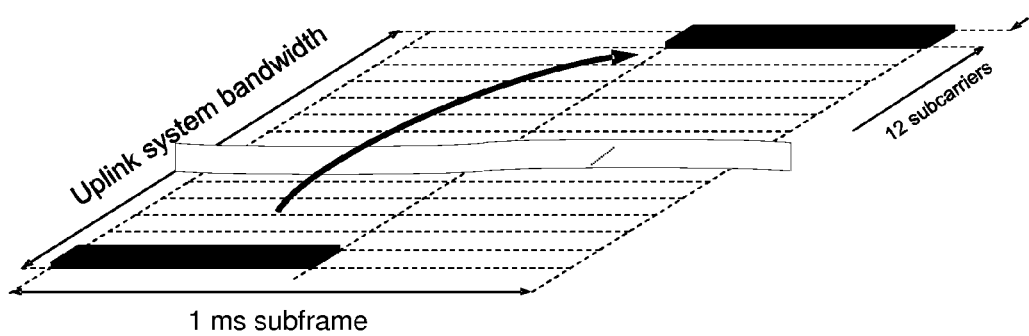
FIG. 5 illustrates schematically a PUCCH structure.
Figure 6:
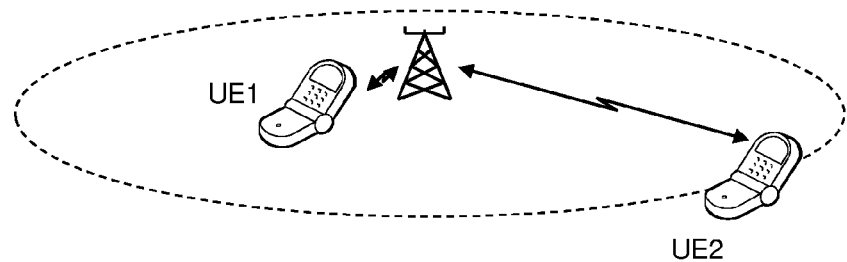
FIG. 6 is a schematic Illustration of cell with two UEs at different distance from the radio network node.
Figure 7:
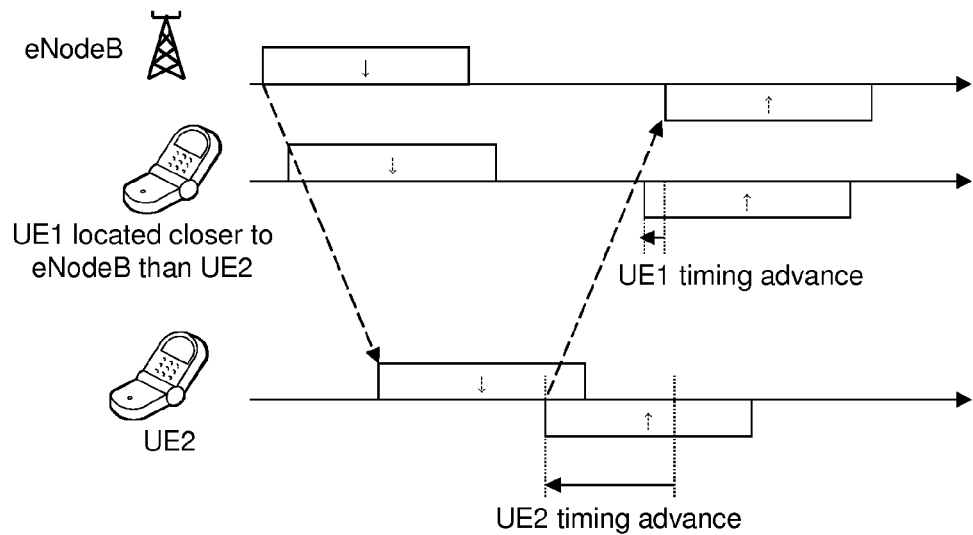
FIG. 7 illustrates schematically a timing advance of UL transmissions depending on distance to the radio network node.

Throughout the following description similar reference numerals have been used to denote similar elements, parts, items or features, when applicable.

Figure 8:
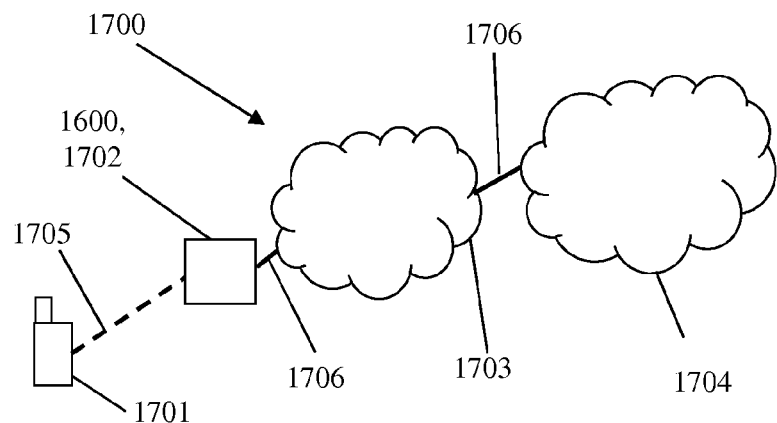
FIG. 8 illustrates schematically a network according to the example embodiments.

FIG. 8 shows a network configuration 1700 according to example embodiments. The radio network node 1600, 1702 is part of a radio access network 1703 comprising one or several radio network nodes and any other devices for communicating with each other. The radio network node 1600, 1702 may be an eNB, sometimes referred to as an eNodeB. The evolved-NodeB, or eNB, is the radio access part of a UMTS LTE system. An LTE system may be based on OFDM radio technology. The radio access network 1703 may also be based on OFDM radio technology. The radio network node has communicative connection with a UE 1701 using a wireless communication link 1705. The radio access network is in turn connected to a core network 1704 that may handle mobility, charging, packet data network gateway, and other suitable issues. The core network 1704 may provide access to a packet data network (e.g., the internet, not shown) or circuit switched network for access to applications and for providing communication with other UEs located in other networks. In some example embodiments a radio communication system (or network configuration) 1700 comprises the radio network node 1600, 1702 and said at least one user equipment 1701.

Figure 9:
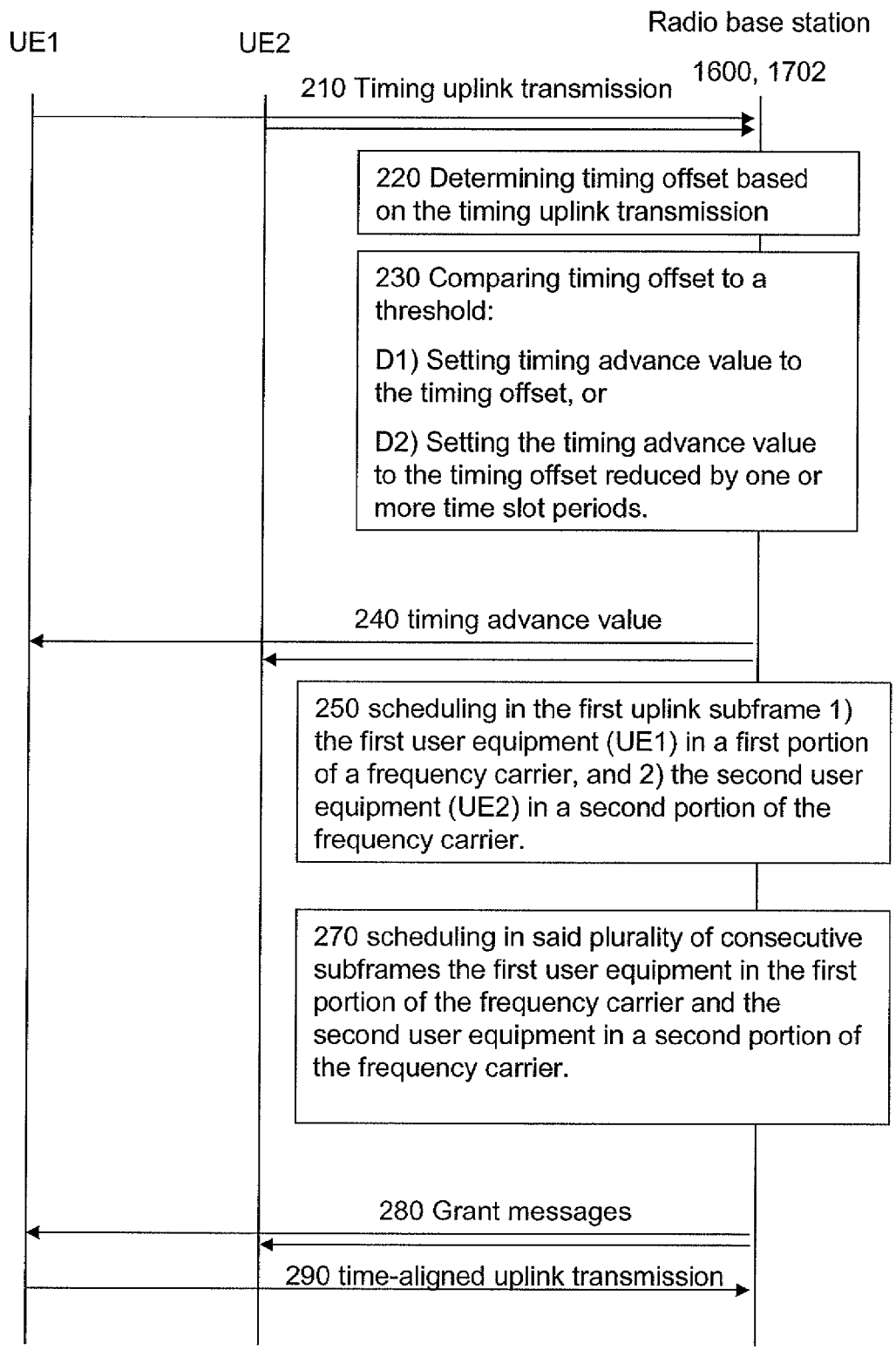
FIG. 9 shows an exemplifying, schematic combined signaling and flow chart of an embodiment of the method according to the example embodiments.

With reference to FIG. 9, there is illustrated an exemplifying, schematic combined signaling and flow chart of an embodiment of the method according to example embodiments, when implemented in the network configuration 1700 according to FIG. 8. Now, in FIG. 9, there is shown an exemplifying method, performed in the network of FIG. 8, for controlling uplink transmission from at least one user equipment 1701 to arrive time aligned with a time slot structure at the radio network node 1600, 1702, wherein the time slot structure may be a sequence of time slots, each time slot may have a time slot period. Optionally, the time slots may have equal time slot periods. In at least one embodiment, the following example operational steps are performed. The order of the steps may differ from what is illustrated below and in the corresponding Figure.

In an example operational step 210, the radio network node 1600, 1702 receives from said at least one user equipment 1701 (UE1 or UE2) a timing uplink transmission.

In an example operational step 220, the radio network node 1600, 1702 determines a timing offset based on the timing uplink transmission, wherein the timing offset may be indicative of a distance between the radio network node 1600, 1702 and said at least one user equipment 1701 (UE1 or UE2).

In an example operational step 230, the radio network node 1600, 1702 compares the timing offset to a threshold value for determining a timing advance value to be sent to said at least one user equipment 1701 (UE1 or UE2). When performing the comparison in the step 230, one of the following steps may be performed:

in an example operational step D1, the radio network node 1600, 1702 sets the timing advance value to the timing offset, when the timing offset is less than the threshold value, whereby a time-aligned uplink transmission from said at least one user equipment 1701 (UE1 or UE2) may be caused to arrive at the radio network node 1600, 1702 time aligned with a first uplink time slot; or in an example operational step D2, the radio network node 1600, 1702 sets the timing advance value to the timing offset reduced by one or more time slot periods, when the timing offset is greater than or equal to the threshold value, whereby a time-aligned uplink transmission from said at least one user equipment 1701 may be caused to arrive at the radio network node 1600, 1702 time aligned with a second uplink time slot that is later than the first uplink time slot. Optionally, the second time slot may succeed directly adjacent the first time slot or succeed later than the first time slot by one or more time slot periods.

In an example operational step 240, the radio network node 1600, 1702 sends to said at least one user equipment 1701 (UE1 or UE2) the timing advance value.

In order to reach cell ranges exceeding, for example, 100 km in LTE, the radio network node may configure the UEs close to or exceeding a distance of 100 km from the antenna of the radio network node to arrive at a later, well defined time. The UL transmissions from these UEs may be configured to arrive at multiples of a slot, i.e. 0.5 ms; this ensures that the same FFT processing may be used for all users, even if some transmissions arrive one or more slots later to the radio network node.

The example embodiments presented herein allows for cell ranges exceeding 100 km in LTE at a reasonable complexity increase in the radio network node. This is achieved without introducing more stringent processing requirements on the UEs or changes to the HARQ timing relations between UL and DL and is compatible with 3GPP Release-8 UEs.

Figure 10:
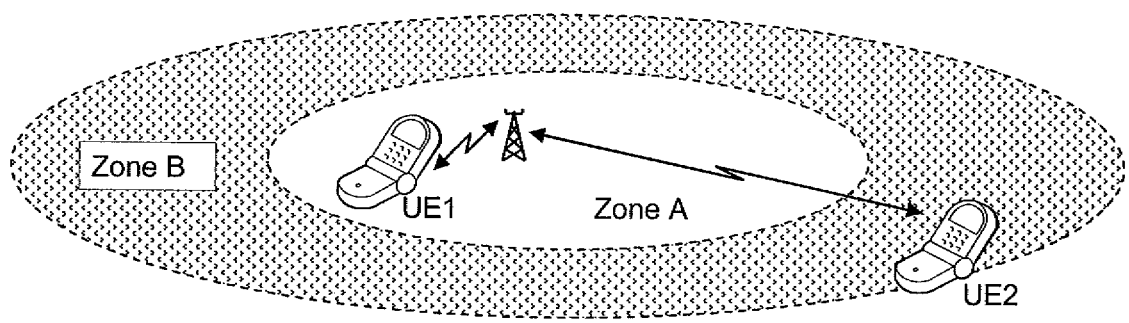
FIG. 10 is a schematic Illustration of a cell with two timing offset zones, where UE1 belongs to timing offset zone A.

Notably, when the timing offset is less than the threshold value, said at least one UE 1701 (e.g., UE1) is said to be in zone A and when the timing offset is greater than or equal to the threshold value, said at least one UE 1701 (e.g., UE2) is said to be in zone B, as illustrated in FIG. 10. Moreover, the timing advance value is quantized such as to configure the UE to send uplink transmissions for arrival at the radio network node 1600, 1702 at the time slots, i.e. time-aligned with the time slot structure. The radio network node may be said to define a number of different timing offset zones (two, three or more timing offsets zones may be defined). UL transmissions from UEs with timing offsets belonging to different timing offset zones may arrive at different times to the receiver of the radio network node, while UEs belonging to the same timing offset zone may arrive at the same time to the receiver of the radio network node.

When the UE performs random access, it may transmit a random access preamble with timing advance value set to zero. This means that the radio network node can measure the absolute timing offset of the detected preamble.

Based on the measured timing offset, the radio network node in one or more embodiments selects the appropriate timing offset zone. If the measured timing offset corresponds to timing offset zone B in FIG. 10 (i.e. the measured timing offset is greater than the threshold value), the UE is configured such that any further UL transmissions will arrive at time zone B timing offset, $T_{zone\ B}$, to the receiver of the radio network node.

In order to achieve this, the TA command sent to the UE may be calculated as

TA value=measured timing offset−zone $B$ timing offset

UL transmissions from UEs far away from the radio network node, i.e. UEs belonging to a timing offset zone for larger timing offsets, thus arrive at the radio network node later than the UL transmissions from UEs close to the radio network node. The concept of timing offset zones is illustrated in FIGS. 10 and 12.

Thus, in an example embodiment, the arrival of UL transmissions from UEs in different zones is configured such that the same FFT processing may be done for all UEs, regardless of which zone they belong to. This reduces both the FFT processing capacity requirements and the intra-cell interference between users belonging to different zones. Typical timing offsets between the zones will, in the context of LTE, be 0.5 ms and 1 ms, i.e. multiples of a slot.

Figure 12:
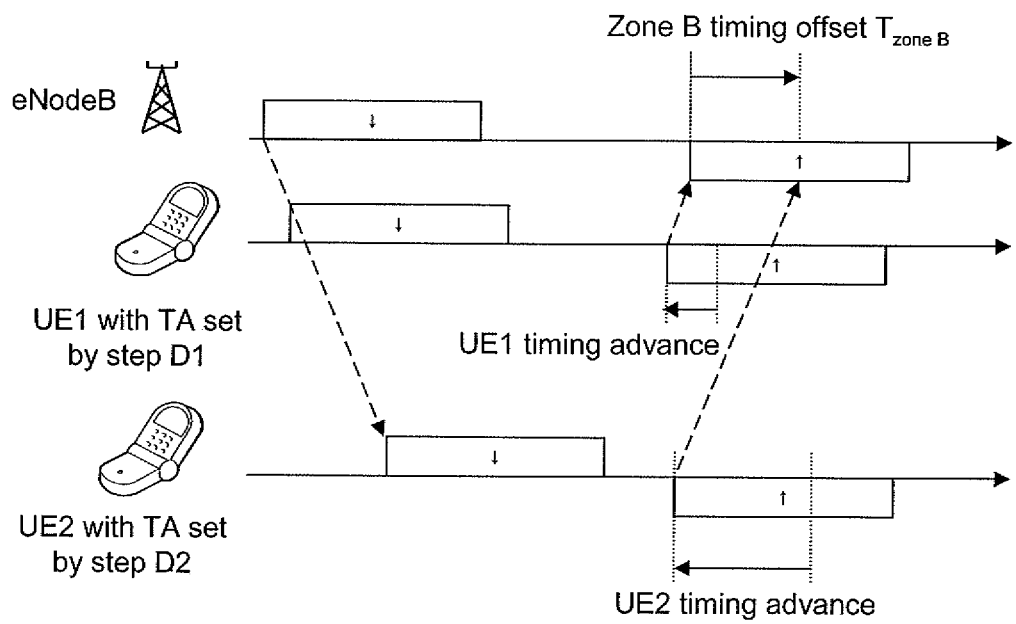
FIG. 12 is a schematic Illustration of timing offset at the receiver of the radio network node for UEs belonging to different timing offset zones. The UL transmission from UE2 in zone B arrives one slot, i.e. half a subframe, after the UL transmission from UE1 in zone A.

Specifically, as shown in FIGS. 10 and 12, if eNodeB located in zone A sends download link data (represented by a block with a downward arrow) to UE1 and UE2, the data will first be received by UE1 and by UE2 at a later time. The timing advance of UE1 may be determined by using the example operational step D1, as discussed above. The timing advance of UE2 may be determined by using the example operational step D2, as discussed above. The data received by the eNodeB may include a timing offset $T_{zone\ B}$ as illustrated in the upmost timing diagram of the eNodeB.

It may be understood that a transmission, which may be time-aligned or not time-aligned and/or uplink or downlink, as used herein extends over at least one time slot period. The transmission may extend over one transmission timing interval (TTI).

Figure 11:
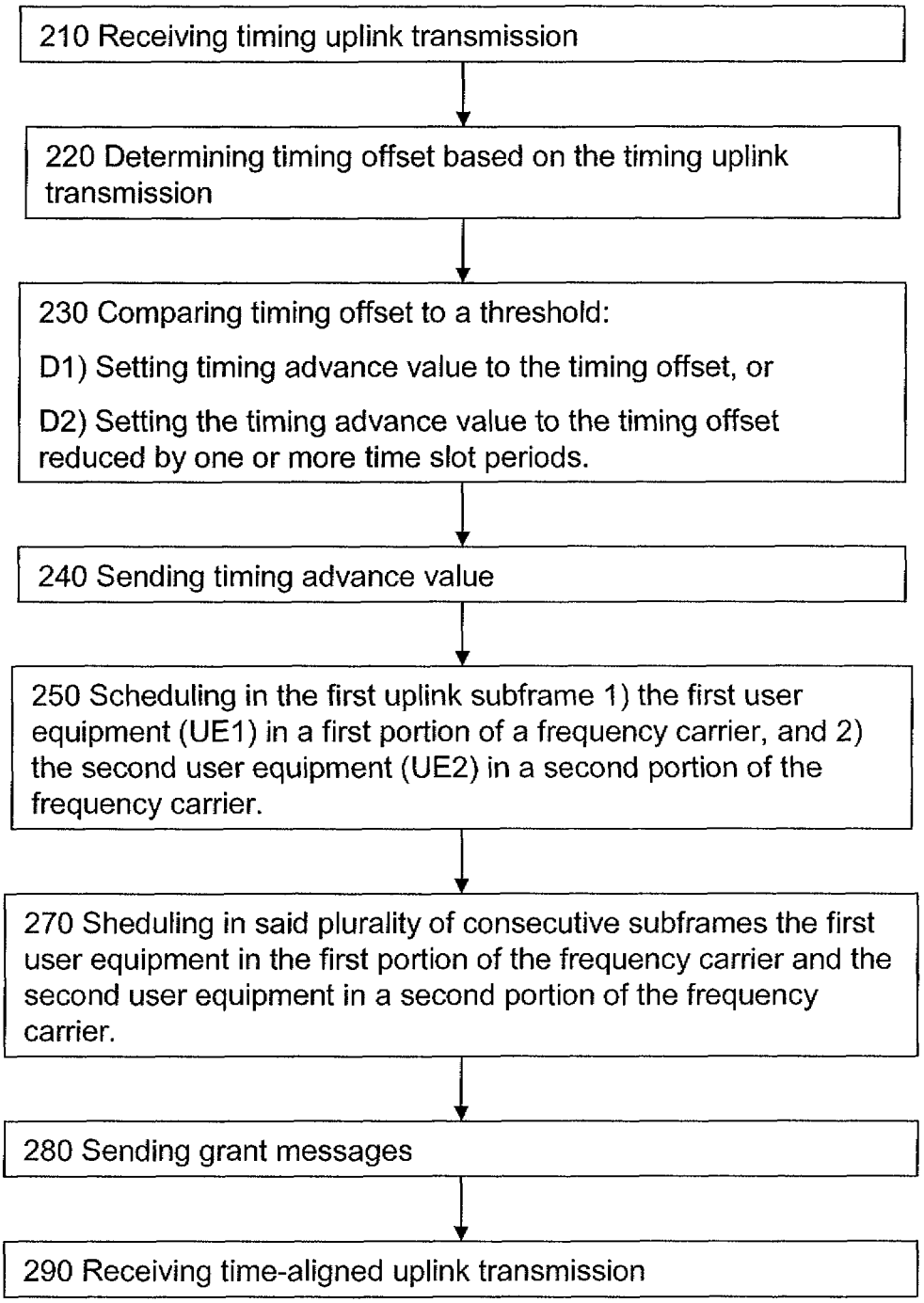
FIG. 11 shows an exemplifying, schematic flow chart of an embodiment of the method in the radio network node according to the example embodiments.

FIG. 11 illustrates an exemplifying method in a radio network node 1600, 1702 for controlling uplink transmission from at least one user equipment 1701 to arrive time aligned with a time slot structure at the radio network node 1600, 1702, wherein the time slot structure may be a sequence of time slots, each time slot may have a time slot period. The following example operational steps may be performed. The order of the example operational steps may differ from what is illustrated below and in the corresponding Figure.

In an example operational step 210, the radio network node 1600, 1702 receives from said at least one user equipment 1701 (e.g., UE1 or UE2) a timing uplink transmission.

In an example operational step 220, the radio network node 1600, 1702 determines a timing offset based on the timing uplink transmission, wherein the timing offset may be indicative of distance in time between the radio network node 1600, 1702 and said at least one user equipment 1701 (e.g., UE1 or UE2).

In an example operational step 230, the radio network node 1600, 1702 compares the timing offset to a threshold value for determining a timing advance value to be sent to said at least one user equipment 1701 (e.g., UE1 or UE2). When performing the comparison in the example operational step 230, one of the following steps may be performed:

in an example operational step D1, the radio network node 1600, 1702 sets the timing advance value to the timing offset, when the timing offset is less than the threshold value, whereby a time-aligned uplink transmission from said at least one user equipment 1701 (e.g., UE1 or UE2) may be caused to arrive at the radio network node 1600, 1702 time aligned with a first uplink time slot; or in an example operational step D2, the radio network node 1600, 1702 sets the timing advance value to the timing offset reduced by one or more time slot periods, when the timing offset is greater than or equal to the threshold value, whereby a time-aligned uplink transmission from said at least one user equipment 1701 (e.g., UE1 or UE2) may be caused to arrive at the radio network node 1600, 1702 time aligned with a second uplink time slot that is later than the first uplink time slot. Optionally, the second time slot may succeed directly adjacent the first time slot or succeed later than the first time slot by one or more time slot periods.

In an example operational step 240, the radio network node 1600, 1702 sends to said at least one user equipment 1701 (e.g., UE1 or UE2) the timing advance value.

Hence, in example embodiments of the method, there is provided a method for setting the timing advance value for at least one user equipment as presented herein.

In some example embodiments of a method in the radio network node 1600, 1702, the timing uplink transmission received in example operational step 210 may be non-aligned with the time slot structure. Furthermore, in some embodiments of the method in the radio network node 1600, 1702, the timing uplink transmission received in example operational step 210 may be a random access preamble. The random access preamble may, for example, be defined by LTE standards as is known in the art.

In some example embodiments of the method in the radio network node 1600, 1702, the timing uplink transmission received in example operational step 210 may be time-aligned with the time slot structure. Furthermore, in some embodiments of the method in the radio network node 1600, 1702, the timing uplink transmission received in example operational step 210 may be a PUSCH transmission, i.e. a transmission on channel PUSCH.

In some example embodiments of the method in the radio network node 1600, 1702, the timing advance value in example operational step 240 may be sent in a random access response. The random access response may, for example, be defined by LTE standards as is known in the art.

In some example embodiments of the method in the radio network node 1600, 1702, said at least one user equipment 1701 may comprise a first user equipment UE1 and a second user equipment UE2. The timing advance value may be set according to the example operational step D1 for the first user equipment UE1. A second timing advance value may be set according to the example operational step D2 for the second user equipment UE2. A plurality of consecutive subframes is associated with the time slot structure, each subframe comprising two subsequent time slots of the time slot structure. In more detail, the time-aligned uplink transmission may be a time aligned uplink transmission from the first user equipment UE1 and the time-aligned uplink transmission may be a time-aligned uplink transmission from the second user equipment UE2. The following example operational steps may be performed, as illustrated in FIGS. 9 and 11.

In an example operational step 280, the radio network node 1600, 1702 may send in a first and second downlink subframe of said plurality of consecutive subframes a first uplink grant message to the second user equipment UE2 and a second uplink grant message to the first user equipment UE1, wherein the second downlink subframe may be later than the first downlink subframe. An uplink grant message is indicative of what resources the user equipment at hand may use. A resource may be identified by a set of symbols, wherein each symbol may comprise a frequency carrier during an OFDM symbol interval, including burst period and cyclic prefix. Optionally, the second uplink grant message may be sent in the second downlink subframe.

In an example operational step 290, the radio network node 1600, 1702 may receive in a first uplink subframe the time-aligned uplink transmission from the first user equipment UE1 and the time-aligned uplink transmission from the second user equipment UE2.

In some example embodiments of the method in the radio network node 1600, 1702, the example operational step 280 may be replaced by a step in which the radio network node 1600, 1702 may send in a first downlink subframe of said plurality of consecutive subframes a first uplink grant message to the second user equipment UE2 and may send a second uplink grant message to the first user equipment UE1 (optionally, in the same or a second downlink subframe).

With the solution described above, the transmissions from users, such as the second user equipment UE2, belonging to zones with large timing offset, i.e. the timing advance value is set according to the example operational step D2, will extend into the next subframe. As can be seen from FIG. 12, transmission from a second user equipment UE2 may arrive at the middle of a subframe at which transmission from a first user equipment UE1 may have arrived. Hence, the transmission may collide in the time domain.

Figure 13:
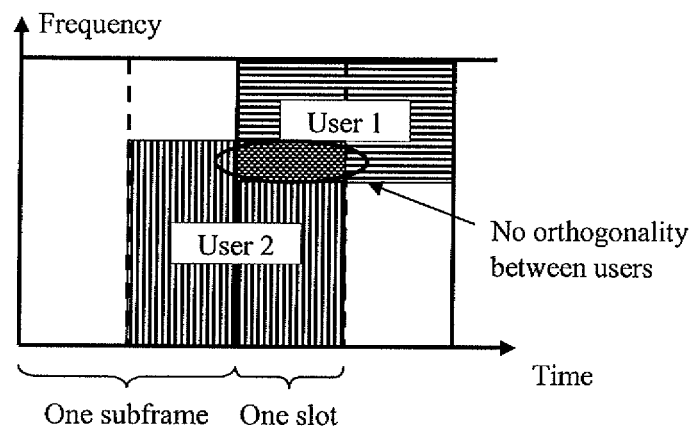
FIG. 13 illustrates schematically transmission from user 2 that extends into user 1 in the next subframe.

An example of transmission collision is illustrated in FIG. 13. In FIG. 13 the frequency range is represented as the vertical axis and various subframes in time are represented in a horizontal axis. If a user belonging to a zone with smaller timing offset, such as the first user equipment User 1 as illustrated in FIG. 13, is scheduled in the next subframe on the same physical resource block as User 2, the orthogonality between subframes will be lost and the users (User 1 and User 2) will cause interference to each other, as illustrated by the ellipse in FIG. 13. Thus, the transmission from User 1 and User 2 now collide in the time domain and in the frequency domain.

Now, the collision of transmission from a plurality of user equipments, some of said plurality of user equipments being assigned a timing advance value according example operational step D1 and some of said plurality of user equipments being assigned a timing advance value according to example operational step D2, will be discussed in more detail. As is known in the art, the radio network node makes a scheduling decision for each transmission timing interval (TTI), which comprises two time slots. Orthogonality between users may, hence, be lost (or collisions between users may occur), when the scheduler schedules in a first TTI, for example, the second user equipment UE2 to use a first portion of a frequency carrier, and when the scheduler schedules in a second TTI, being directly adjacent to the first TTI, the first user equipment UE1 to use said first portion of the frequency carrier. The collision may occur, because the transmission from the second user equipment UE2 arrives to the radio network node later than expected by the scheduler, since the second user equipment UE2 has a timing advance value that is set according to the step example operational D2.

In order to prevent such collisions, the radio network node may ensure that orthogonality between users is maintained. Orthogonality between users may be maintained, if the radio network node does not schedule a UE belonging to a zone with small timing offset such that it generates an UL transmission on the same UL physical resource block(s) where a UE belonging to a zone with large timing offset was transmitting in the previous subframe. Thus, the radio network node takes the TA value of each UE into account when scheduling. Moreover, the radio network node takes the scheduling decision of a subframe, preceding the subframe to be scheduled, into account.

This may be done
    dynamically, where the UL scheduler (for UL-SCH) and DL scheduler or PDCCH manager (for ACK/NACK on PUCCH), take the scheduling decisions of the previous subframe into account, i.e. remembers where UL transmissions from UEs with large timing offset were scheduled in the previous subframe; or
    semi-statically, where the UL resources are partitioned so that different physical resource blocks are used for the UEs belonging to the different timing offset zones.

Figure 14:
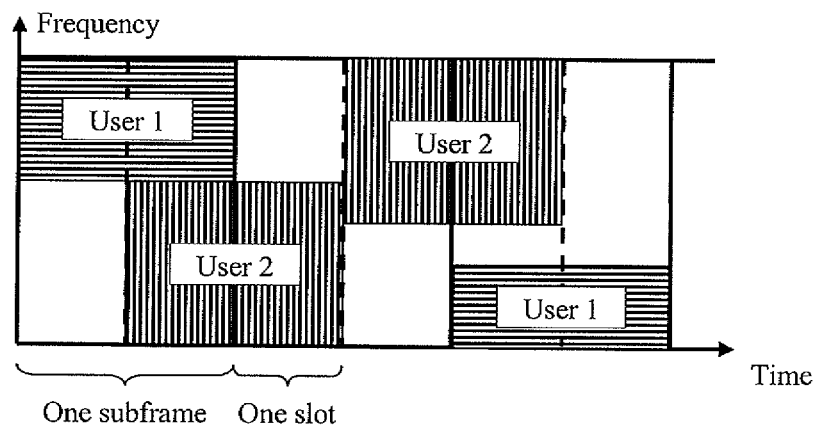
FIG. 14 illustrates schematically dynamic scheduling of UL resources.

An example of dynamic scheduling is illustrated in FIG. 14. As shown, for every one subframe, users (User 1 and User 2) may be allocated UL recourses which may change from subframe to subframe. For example, in a first subframe User 1 is allocated UL resources corresponding to higher frequencies and User 2 is allocated UL resources corresponding to lower frequency ranges. In the next subframe, the allocation of UL resources of User 1 and User 2 are interchanged. Thus, decisions on the scheduling of UL resources for individual users may be performed based on the scheduling of previous subframes. It should be appreciated that the interchanging of UL resources is merely an example and any other allocation scheme may be employed.

Figure 15:
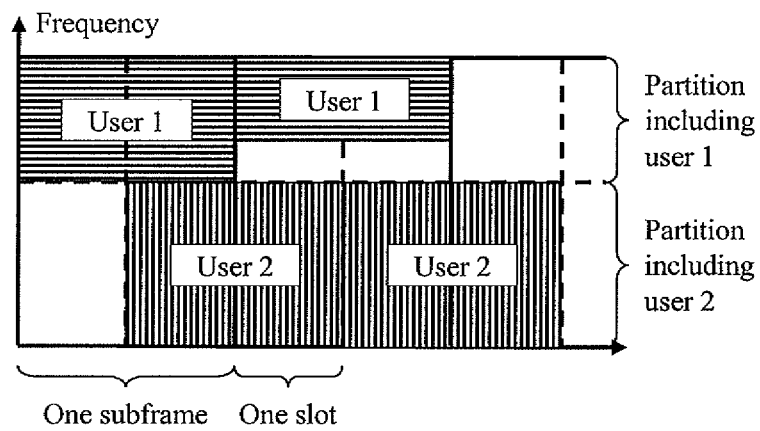
FIG. 15 illustrates schematically semi-static partitioning of UL resources.

An example of semi-static partitioning of the frequency carrier is illustrated in FIG. 15, where User 1 belongs to a zone with smaller timing offset than User 2. In the example provided by FIG. 15, specific users may be assigned specific UL resources, thereby partitioning the resources. For example, User 1 is allocated resources in a partition corresponding to a higher frequency, while User 2 is allocated resources in a partition corresponding to a lower frequency.

In some example embodiments of the method in the radio network node 1600, 1702, the following example operational step may be performed (compare with FIG. 14).

In an example operational step 250, the radio network node 1600, 1702 schedules in the first uplink subframe 1) the first user equipment UE1 in a first portion of a frequency carrier, and 2) the second user equipment UE2 in a second portion of the frequency carrier. The first and second portions of the frequency carrier may be non-overlapping. The radio network node 1600, 1702 may find out what resources, such as subcarrier or portion of a resource block, to assign to the user equipment at hand in the uplink subframe being scheduled. As a consequence, determining resources available to the user equipment at hand, such as the first or the second user equipment, before sending the uplink grant message to the user equipment at hand, may be useful.

In some example embodiments of the method in the radio network node 1600, 1702, the following example operational step may be performed (compare with FIG. 15).

In the example operational step 270, the radio network node 1600, 1702 schedules in said plurality of consecutive subframes the first user equipment UE1 in the first portion of the frequency carrier and the second user equipment UE2 in the second portion of the frequency carrier.

In some example embodiments of the method in the radio network node 1600, 1702, the first and second portions of the frequency carrier may be associated to a first and second set of consecutive subcarriers of the frequency carrier, respectively, wherein the first and second sets of subcarriers may be dynamically determined or predetermined. Thus, orthogonality between users may be obtained in a static or semi-static manner.

In the following, it is explained how orthogonality on PUCCH may be maintained.

Figure 16:
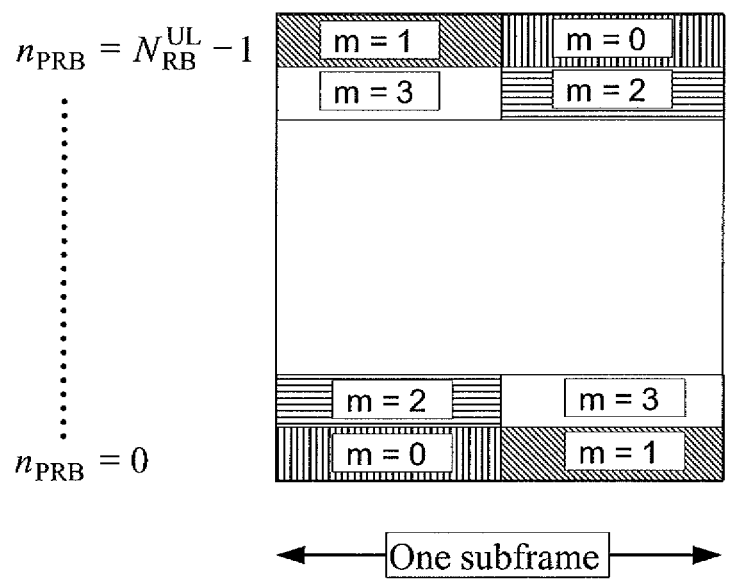
FIG. 16 illustrates schematically mapping to physical resource blocks for PUCCH.

For uplink transmissions on PUCCH, frequency hopping may be used between the slots in a subframe. A mirroring scheme may be used so that a user may be allocated in one side of the frequency band in the first slot is allocated in the other side in the second slot. The mapping to physical resource blocks is illustrated in FIG. 16, where the variable m denotes the pair of physical resource blocks that can be allocated to a user.

Code multiplexing may be used on PUCCH to be able to transmit several users in the same physical resource blocks, i.e. using the same values of m. However, since the code that is used for multiplexing has a period of 10 ms, it may not be preferred to code multiplex users belonging to different timing offset zones in the same physical resource block. Thus, each physical resource block received in the radio network node may comprise users from the same timing offset zone, in order to achieve orthogonality between the different terminals that transmit PUCCH on the same physical resource block.

Therefore, in some example embodiments of the method, when the time-aligned uplink transmission is sent on PUCCH, the step of scheduling (270) may further comprise scheduling in the first portion of the frequency carrier only user equipments assigned a timing advance value according to the step D1 and scheduling in the second portion of the frequency carrier only user equipments assigned a timing advance value according to the step D2.

For example, if a user is allocated to m=0 and belongs to a zone that is delayed one slot, it may occupy physical resource blocks corresponding to m=1 in the current and next subframe that are received in the radio network node. In order to maintain orthogonality, no users that belong to the zone with zero delay may be allocated to m=1 in these two subframes.

In some example embodiments of the method in the radio network node 1600, 1702, the time-aligned uplink transmission from the first user equipment UE1 and/or second user equipment UE2 comprise information about HARQ feedback or about one or more of SR, CQI, PMI and RI.

In some example embodiments of the method in the radio network node 1600, 1702, one FFT is applied to the time-aligned uplink transmissions from the first user equipment UE1 and/or second user equipment UE2. The same FFT may, hence, be applied to all transmissions regardless of which of the steps D1 and D2 has been performed in order to set the timing advance value for said at least one UE. The expression "one FFT may be applied" is understood to mean that several signals, being time synchronized with the time slot structure, are feed into the same FFT processing module of the radio network node 1600, 1702 or the like.

Figure 17:
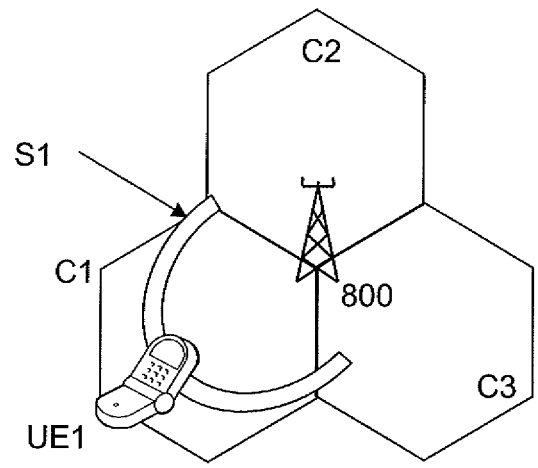
FIG. 17 illustrates schematically a cell identity positioning combined with TA. The terminal position is determined as the intersection of the serving cell and the circular strip.

The timing advance value may be used for positioning of terminal, so called enhanced cell id positioning as is known in the art. The timing advance positioning principle is depicted in FIG. 17. Briefly, the travel time of radio waves from the radio network node to the terminal is measured. The distance, r, from the radio network node to the terminal may then be computed as $$r = c\frac{TA}{2}$$

where TA is the timing advance value and where c is the speed of light.

The TA measurement alone defines a circle, or if the inaccuracy is accounted for, a circular strip around the radio network node. By combining this information with the cell description, left and right angles of the circular strip may be determined (see FIG. 17).

Specifically, the example provided in FIG. 17 illustrates how a base station 800 may determine the distance to a user UE1. There may be some uncertainty associated with this distance estimate, so the possible positions of the UE1 are shown as a circular strip S1 around the base station 800. The base station may communication with UE1 in three cells C1, C2, and C3. The UE cell description may provide information regarding a current cell in which UE1 is located. Knowledge of the cell description allows the base station 800 to limit the strip S1 from a circular strip to the partial circle (the intersection of the full circular strip with the cell C1) illustrated in FIG. 17.

Within the scope of enhanced cell id positioning LTE Rel-9 includes two different types of TA measurements, i.e. type 1 and type 2. The TA measurement can be used standalone or it can be combined with other measurements when the network calculates the UE position. Common for both types of measurement is that the base station can send the measured value to a node that calculates the UEs position.

Type 1 measurement is based on that both the UE and the radio network node measuring the difference between Rx and Tx timing and these to measured values are combined in the radio network node.

For Type 2 the radio network node measures the Rx and Tx timing difference while the UE transmits a PRACH. For both the type 1 and type 2 messages the position of the UE may be calculated in a network node that the base station may send its measured values to.

Type 1 and type 2 TA measurement are defined in detail as Timing advance (TADV) type 1 is defined as the time difference TADV=(eNB Rx–Tx time difference)+(UE Rx–Tx time difference), where the eNB Rx (Reception)–Tx (Transmission) time difference corresponds to the same UE that reports the UE Rx–Tx time difference.

The eNB Rx–Tx time difference is defined as TeNB-Rx–TeNB-Tx
Where:
TeNB-Rx is the eNB received timing of uplink radio frame #i, defined by the first detected path in time.
TeNB-Tx is the eNB transmit timing of downlink radio frame #i.
The UE Rx–Tx time difference is defined as TUE-Rx–TUE-Tx
Where:
TUE-Rx is the UE received timing of downlink radio frame #i from the serving cell, defined by the first detected path in time.
TUE-Tx is the UE transmit timing of uplink radio frame #i.
Timing advance (TADV) type 2 is defined as the time difference TADV=(eNB Rx–Tx time difference), where the eNB Rx–Tx time difference may correspond to a received uplink radio frame comprising PRACH from the respective UE, TeNB-Rx may be the eNB received timing of uplink radio frame #i, defined by the first detected path in time and TeNB-Tx may be the eNB transmit timing of downlink radio frame #i.

For the Type 1 measurement the UE Rx–Tx time difference may correspond to the UEs time advanced value and the eNB Rx–TX time advance value may correspond to the measured error in the UE time advance value.

If the present solution is implemented to extend the cell range of the cell, the Type 1 TA positioning method described above will yield an incorrect position. The reason is that the traveling time of radio waves between the UE and the radio network node does not correspond to the TA for the given UE.

Hence, in some example embodiments of the method in the radio network node 1600, 1702, the following steps may be performed.

The radio network node 1600, 1702 may determine a position of said at least one UE, when the timing advance value of said at least one user equipment has been set according to the step D2. In more detail, the step of determining the position may comprises the following steps.

The radio network node 1600, 1702 may receive, from said at least one user equipment 1701, Rx–Tx time difference.

The radio network node 1600, 1702 may generate an adjusted Rx–Tx time difference by at least adjusting the received Rx–Tx time difference with one or more time slot periods.

The radio network node 1600, 1702 may determine a distance timing, indicative of the position of said at least one UE, based on the adjusted Rx–Tx time difference.

In another exemplifying embodiment the radio network node can calculate the correct position by including the zone B timing offset when calculating the Type 1 measurement. An example of this is shown below for the case that the UE belongs to timing offset zone B:

TADV=(eNB Rx–Tx time difference)+(UE Rx–Tx time difference)+zone B timing offset In a further embodiment the zone B timing offset may be comprised in TADV when the Type 1 measurement is report to a network node for positioning.

Figure 18:
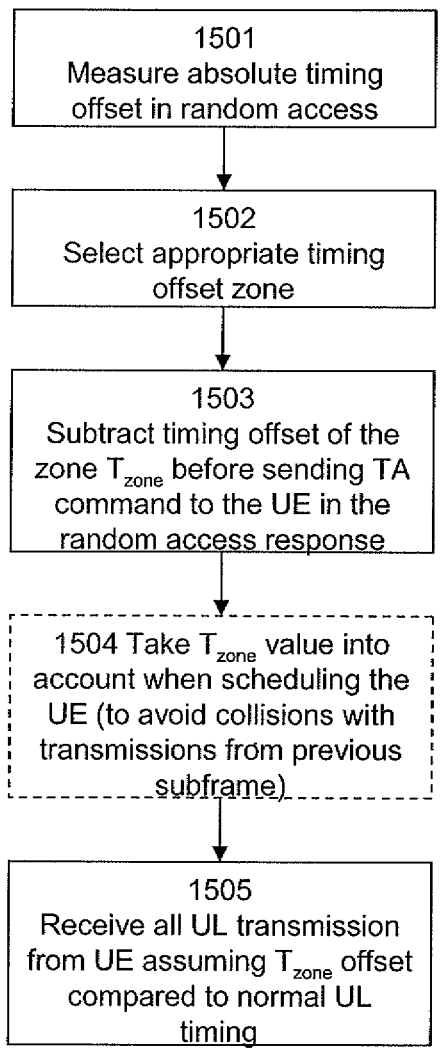
FIG. 18 illustrates schematically a method according to the example embodiments in a flow chart.

With reference to FIG. 18, an example method embodiment may be discussed:

1501. A node, e.g. the eNB, in the network measures absolute timing offset in random access.

1502. The appropriate timing offset zone is selected.

1503. Timing offset of the zone $T_{zone}$ is subtracted before sending TA command to the UE in a random access response.

1504. The $T_{zone}$ value is taken into account when scheduling the UE, to avoid collisions with transmissions from previous subframe. This step may be optional.

1505. All UL transmissions from the UE are received assuming $T_{zone}$ offset compared to normal UL timing.

Figure 19:
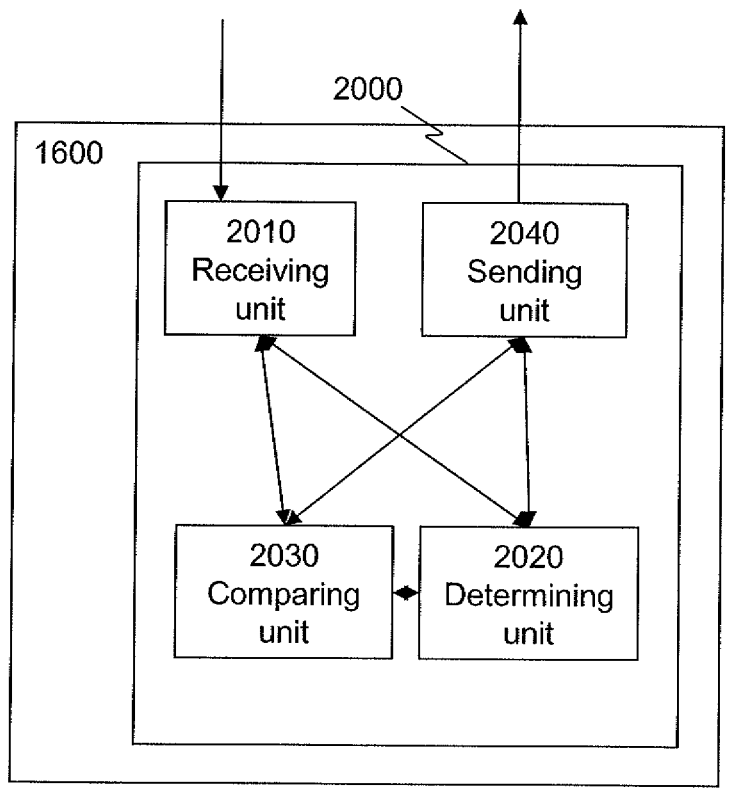
FIGS. 19 and 20 illustrates schematically a device according to the example embodiments.

In FIG. 19, there is shown an exemplifying arrangement 2000 (1610 in FIG. 20) in a radio network node 1600, 1702 for controlling uplink transmission from at least one user equipment 1701 to arrive time aligned with a time slot structure at the radio network node 1600, 1702. The time slot structure may be a sequence of time slots, each time slot having a time slot period. The example arrangement 2000, 1610 may comprise a receiving unit 2010 that is configured to receive from said at least one user equipment 1701 a timing uplink transmission, and a determining unit 2020 that is configured to determine a timing offset based on the timing uplink transmission. The timing offset may be indicative of distance in time between the radio network node 1600, 1702 and said at least one user equipment 1701. Furthermore, the arrangement 2000, 1610 may comprise a comparing unit 2030 that is configured to compare the timing offset to a threshold value for determining a timing advance value to be sent to said at least one user equipment 1701. The comparing unit 2030 further is configured to set the timing advance value to the timing offset, when the timing offset is less than the threshold value, whereby a time-aligned uplink transmission from said at least one user equipment 1701 is caused to arrive at the radio network node 1600, 1702 time aligned with a first uplink time slot. Alternatively, the comparing unit 2030 sets the timing advance value to the timing offset reduced by one or more time slot periods, when the timing offset is greater than or equal to the threshold value, whereby a time-aligned uplink transmission from said at least one user equipment 1701 is caused to arrive at the radio network node 1600, 1702 time aligned with a second uplink time slot that is later than the first uplink time slot. The arrangement 2000, 1610 may further comprise a sending unit 2040 configured to send to said at least one user equipment 1701 the timing advance value.

In some embodiments of the arrangement 2000, 1610 in the radio network node 1600, 1702, the timing uplink transmission received in step A may be non-aligned with the time slot structure. Furthermore, in some embodiments of the arrangement 2000, 1610 in the radio network node 1600, 1702, the timing uplink transmission received in step A may be a random access preamble. The random access preamble may, for example, be defined by LTE standards as is known in the art.

In some example embodiments of the arrangement 2000, 1610 in the radio network node 1600, 1702, the timing uplink transmission received in step A may be time-aligned with the time slot structure. Furthermore, in some example embodiments of the arrangement 2000, 1610 in the radio network node 1600, 1702, the timing uplink transmission received in step A is a PUSCH transmission.

In some example embodiments of the arrangement 2000, 1610 in the radio network node 1600, 1702, the timing advance value in step E may be sent a random access response. The random access response may, for example, be defined by LTE standards as is known in the art.

In some example embodiments of the arrangement 2000, 1610 in the radio network node 1600, 1702, said at least one user equipment 1701 may comprise a first user equipment UE1 and a second user equipment UE2. The timing advance value has been set according to the step D1 for the first user equipment UE1. A second timing advance value has been set according to the step D2 for the second user equipment UE2. A plurality of consecutive subframes may be associated with the time slot structure, each subframe may comprise two subsequent time slots of the time slot structure. In more detail, the time-aligned uplink transmission may be a time aligned uplink transmission from the first user equipment UE1 and the time-aligned uplink transmission may be a time-aligned uplink transmission from the second user equipment UE2. The sending unit 2040 may further be configured to send in a first and second downlink subframe of said plurality of consecutive subframes a first uplink grant message to the second user equipment UE2 and a second uplink grant message to the first user equipment UE1, wherein the second downlink subframe is later than the first downlink subframe. An uplink grant message may be indicative of what resources the user equipment at hand may use. A resource may be identified by a set of symbols, wherein each symbol may comprise a frequency carrier during a burst period. The symbols may be separated by cyclic prefixes as is known in the art. Optionally, the second uplink grant message may be sent in the second downlink subframe. The receiving unit 2010 may further be configured to receive in a first uplink subframe the time-aligned uplink transmission from the first user equipment UE1 and the time-aligned uplink transmission from the second user equipment UE2.

In some example embodiments of the arrangement 2000, 1610 in the radio network node 1600, 1702, the arrangement 1610 may further be configured to schedule in the first uplink subframe 1) the first user equipment UE1 in a first portion of a frequency carrier, and 2) the second user equipment UE2 in a second portion of the frequency carrier. The first and second portions of the frequency carrier may be non-overlapping.

In some example embodiments of the arrangement 2000, 1610 in the radio network node 1600, 1702, the arrangement 2000, 1610 may further be configured to schedule in said plurality of consecutive subframes the first user equipment UE1 in the first portion of the frequency carrier and the second user equipment UE2 in the second portion of the frequency carrier.

In some example embodiments of the arrangement 2000, 1610 in the radio network node 1600, 1702, the first and second portions of the frequency carrier are associated to a first and second set of consecutive subcarriers of the frequency carrier, respectively, wherein the first and second sets of subcarriers are dynamically determined or predetermined. Thus, orthogonality between users may be obtained in a static or semi-static manner.

In some example embodiments of the arrangement 2000, 1610 in the radio network node 1600, 1702, the arrangement may further be configured to send the time-aligned uplink transmission on PUCCH and may further be configured to schedule in the first portion of the frequency carrier only user equipments assigned a timing advance value according to the step D1 and in the second portion of the frequency carrier only user equipments assigned a timing advance value according to the step D2.

In some example embodiments of the arrangement 2000, 1610 in the radio network node 1600, 1702, the time-aligned uplink transmission from the first user equipment UE1 and/or second user equipment UE2 may comprise information HARQ feedback or about one or more of SR, CQI, PMI and RI.

In some example embodiments of the arrangement 2000, 1610 in the radio network node 1600, 1702, one FFT may be applied to the time-aligned uplink transmissions from the first user equipment UE1 and/or second user equipment UE2. The same FFT may, hence, be applied to all transmissions regardless of which of the steps D1 and D2 has been performed in order to set the timing advance value for said at least one UE.

In some example embodiments of the arrangement 2000, 1610 in the radio network node 1600, 1702, the arrangement 2000, 1610 may further be configured to determine a position of said at least one UE, when the timing advance value of said at least one user equipment has been set according to the step D2. In more detail, the arrangement may be configured to receive, from said at least one user equipment 1701, Rx–Tx time difference, and may be configured to generate an adjusted Rx–Tx time difference by at least adjusting the received Rx–Tx time difference with one or more time slot periods. Furthermore, the arrangement may be configured to determine a distance timing, indicative of the position of said at least one UE, based on the adjusted Rx–Tx time difference.

In the following handling of HARQ feedback for DL-SCH on PUCCH is described.

LTE uses hybrid-ARQ (Automatic Retransmission reQuest), where, after receiving downlink data in a subframe, the terminal may attempt to decode it and report to the base station whether the decoding was successful (ACK) or not (NAK). In case of an unsuccessful decoding attempt, the base station can retransmit the erroneous data.

Uplink control signaling from the terminal to the base station may comprise:
hybrid-ARQ acknowledgements for received downlink data;
terminal reports related to the downlink channel conditions, used as assistance for the downlink scheduling; and/or
scheduling requests, indicating that a mobile terminal needs uplink resources for uplink data transmissions.

The terminal reports related to the downlink channel conditions may comprise channel quality indicator (CQI), precoding matrix indicator (PMI) and rank indicator (RI).

For each downlink transmission on DL-SCH, the UE may respond with HARQ feedback. If there is no simultaneous transmission of UL-SCH, the UE may send the HARQ feedback on PUCCH.

The UE may derive the PUCCH resource based on the resource used in downlink to transmit the DL assignment on PDCCH. When allocating the PDCCH resources, the DL scheduler or PDCCH manager may ensure that orthogonality is maintained for all users on PUCCH as described above about maintaining orthogonality on PUCCH. As an option, for example if it is not possible to find orthogonal PUCCH resources, some users may be allowed to be non-orthogonal, whereby additional interference is created.

For users that belong to a timing offset zone that is received with a delay in the radio network node, these will be less time available for processing in the radio network node. The radio network node processing comprises decoding the HARQ feedback in uplink and scheduling new DL-SCH transmissions in downlink.

There are several ways to handle delayed reception in the radio network node:
By adding more hardware resources in the radio network node, or reducing the total capacity e.g. by limiting the total throughput. This will reduce the total processing time in the radio network node.

By waiting until the next scheduling period before acting on the HARQ feedback for delayed users. This is possible since HARQ is asynchronous in DL. However, it will increase the total HARQ loop delay, which leads to that it is not possible to have continuous transmission to the same UE. The reason is that the number of HARQ processes is limited and dimensioned exactly according to the HARQ loop delay.

In the following handling of UL-SCH on PUSCH is explained.

For UL-SCH transmissions on PUSCH in uplink, the resources may be allocated dynamically by the UL scheduler. The UL scheduler may ensure that orthogonality is maintained, which can be done statically or dynamically as described above in the discussion about maintaining orthogonality between users.

For the case of a semi-static partitioning of the UL resources, there is a risk of capacity loss if there is not a sufficient number of users in each timing offset zone to be scheduled. To improve capacity, the partitioning of UL resources can be adjusted based on the traffic load for the users in each timing offset zone.

Similar to DL-SCH, there will be less time available for processing in the radio network node for users that are received with a delay in the radio network node. Since HARQ is synchronous in uplink, the handling of delayed reception in the radio network node is different than from downlink:

By adding more hardware resources in the radio network node, or reducing the total capacity e.g. by limiting the total throughput. This will reduce the total processing time in the radio network node.

By reporting ACK to the UE to disable non-adaptive retransmission if the processing time is not sufficient. This leads to that the UE will not transmit in the next opportunity for this HARQ process, and that the physical resources are available for other UEs to be scheduled. If decoding is not successful, the UE must be rescheduled by adaptive retransmission in the following opportunity for this HARQ process. The result is that the UE can only be scheduled on average in one half of the subframes.

By reporting NACK to the UE to request a non-adaptive retransmission, or scheduling an adaptive retransmission, even if the result after decoding is not yet available. This leads to one unnecessary retransmission after successful decoding, which will reduce throughput and/or capacity. However, the loss can be reduced if the HARQ operating point is changed to increase the average number of transmissions.

In the following handling of scheduling request and CQI/PMI/RI on PUCCH is explained.

Scheduling Request (SR) and periodic channel feedback reports of CQI/PMI/RI may be transmitted on PUCCH in uplink. The resources for SR and CQI/PMI/RI are allocated semi-statically. When allocating the PUCCH resources, the radio network node may ensure that orthogonality is maintained for users on PUCCH as described above in the discussion about maintaining orthogonality on PUCCH.

Figure 20:
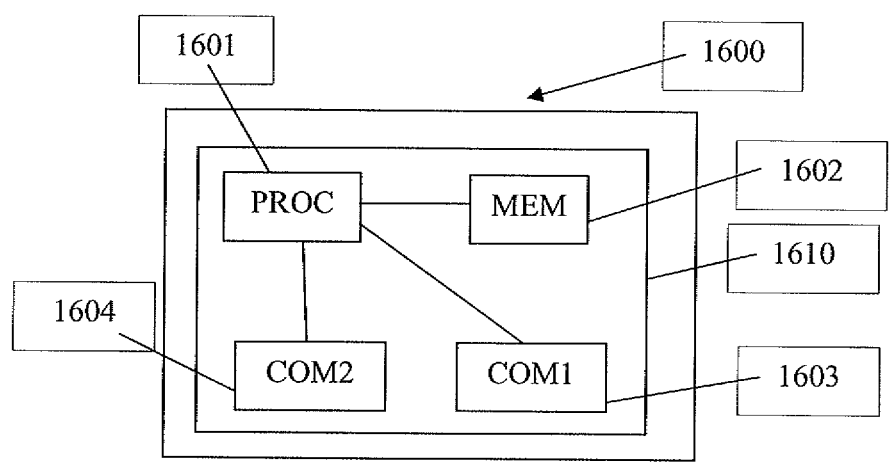

FIG. 20 shows a node, e.g. the eNB, 1600 which controls the timing alignment. The node comprises at least one processing unit 1601 executing hardware and/or software instruction sets, e.g. stored in at least one computer readable storage medium or memory 1602 being of volatile and/or non-volatile type. The processing unit may be connected to the memory unit. The at least one processing unit utilizes at least one communication interface 1603 and 1604 for uplink and downlink communication with the UE and/or a radio access network and core network. The UE may also participate in the process, e.g. taking part in the measurement of distance between UE and the radio network node. The UE also comprises at least one processing unit, and at least one volatile and/or non-volatile memory unit. Furthermore, the UE may also comprise at least one communication interface for communicating with the radio network node.

Processing units may comprise for instance a microprocessor, central processing unit (CPU), a digital signal processor (DSP), an application specific integrated circuit (ASIC), field programmable gate array (FPGA), or similar units capable of executing program instructions.

It should be appreciated that the networks are configured with cabling, routers, switches, and other network building elements as understood by the skilled person, for instance as used for building an Ethernet or WAN (Wide Area Network) network.

The example embodiments presented herein have been exemplified for use in an LTE network; however, it should be appreciated that it may find applicability in other network configurations as may be defined in future standardizations.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention should be apparent for the person skilled in the art.

An exemplary summarized list of example embodiments:
1. An embodiment in a wireless communication network, for handling timing alignment of uplink communication transmissions between user equipment, i.e. UE, and a radio access network node, comprising the steps of:
   determining timing distance between UE and radio access network node;
   configuring UEs, with a distance close to or larger than a pre defined distance in relation to pre set timing advance value, to transmit uplink messages for arrival at a later time slot and in a controlled manner.
2. According to embodiment 1, further comprising the steps of:
   determining timing offset between UE and radio access network node;
   selecting timing offset zone;
   subtracting timing offset of the zone, $T_{zone}$, before sending timing advance command to the UE in a random access response;
   receiving uplink transmissions from the UE.
3. According to embodiment 2, further comprising a step of taking $T_{zone}$ value into account when scheduling the UE.
4. According to embodiment 1, wherein the radio access network is a long term evolution, i.e. LTE, network.
5. According to embodiment 1, wherein the later time slot is a multiple of 0.5 ms.
6. According to embodiment 1, wherein all transmissions are divided into pre defined time zones.
7. According to embodiment 6, wherein the time zones are arranged in multiples of time slots.

8. According to embodiment 1, wherein uplink resources are partitioned or scheduled dynamically or semi-statically.
9. According to embodiment 1, further comprising a step of maintaining uplink transmissions orthogonality.
10. An embodiment in a node in a wireless communication network, comprising:
   at least one processing unit;
   at least one memory unit;
   at least one communication interface;
   wherein the processing unit is arranged to execute instructions sets stored in the memory and using the communication interface, for operating the method according to any of embodiments 1 to 9.
11. According to embodiment 10, wherein the node is a radio access network node.

What is claimed is:

1. A method in a radio network node for controlling uplink transmission from at least one user equipment to arrive time aligned with a time slot structure at the radio network node, wherein the time slot structure is a sequence of time slots, each time slot having a time slot period, wherein the method comprises the steps of:
   A) receiving from said at least one user equipment a timing uplink transmission;
   B) determining a timing offset based on the timing uplink transmission, wherein the timing offset is indicative of a distance in time between the radio network node and said at least one user equipment;
   C) comparing the timing offset to a threshold value for determining a timing advance value to be sent to said at least one user equipment, and performing steps D1) and D2):
   D1) when the timing offset is less than the threshold value, setting the timing advance value to the timing offset, wherein a time-aligned uplink transmission from said at least one user equipment is caused to arrive at the radio network node time aligned with a first uplink time slot, and
   D2) when the timing offset is greater than or equal to the threshold value, setting the timing advance value to the timing offset reduced by one or more time slot periods, wherein a time-aligned uplink transmission from said at least one user equipment is caused to arrive at the radio network node time aligned with a second uplink time slot that is later than the first uplink time slot, and
   the method further comprises a step of:
   E) sending to said at least one user equipment the timing advance value.

2. The method according to claim 1, wherein in step A the timing uplink transmission received is a random access preamble that is non-aligned with the time slot structure or a PUSCH transmission that is time-aligned with the time slot structure.

3. The method according to claim 1, wherein in step E the timing advance value is sent in a random access response.

4. The method according to claim 1, wherein said at least one user equipment comprises a first user equipment and a second user equipment, wherein the timing advance value has been set according to the step D1 for the first user equipment, and wherein a second timing advance value has been set according to the step D2 for the second user equipment, wherein a plurality of consecutive subframes is associated with the time slot structure, each subframe comprising two subsequent time slots of the time slot structure, the method further comprising:
   sending in a first and second downlink subframe of said plurality of consecutive subframes a first uplink grant message to the second user equipment and a second uplink grant message to the first user equipment, wherein the second downlink subframe is later than the first downlink subframe, and
   receiving in a first uplink subframe the time-aligned uplink transmission from the first user equipment and the time-aligned uplink transmission from the second user equipment.

5. The method according to claim 4, wherein the method comprises the further step of:
   scheduling in the first uplink subframe 1) the first user equipment in a first portion of a frequency carrier and 2) the second user equipment in a second portion of the frequency carrier, wherein the first and second portions of the frequency carrier are non-overlapping.

6. The method according to claim 5, further comprising scheduling in said plurality of consecutive subframes the first user equipment in the first portion of the frequency carrier and the second user equipment in the second portion of the frequency carrier.

7. The method according to claim 6, wherein the first and second portions of the frequency carrier are associated to a first and second set of consecutive subcarriers of the frequency carrier, respectively, wherein the first and second sets of subcarriers are dynamically determined or predetermined.

8. The method according to claim 7, wherein the time-aligned uplink transmission is sent on PUCCH and the step of scheduling further comprises scheduling in the first portion of the frequency carrier only user equipments assigned a timing advance value according to the step D1 and scheduling in the second portion of the frequency carrier only user equipments assigned a timing advance value according to the step D2.

9. The method according to claim 4, wherein the time-aligned uplink transmission from the first user equipment and/or second user equipment comprises information about HARQ feedback or about one or more of SR, CQI, PMI and RI.

10. The method according to claim 3, wherein one FFT is applied to the time-aligned uplink transmissions from the first user equipment and/or second user equipment.

11. The method according to claim 1, further comprising determining a position of said at least one UE, when the timing advance value of said at least one user equipment has been set according to the step D2, wherein the step of determining the position comprises the steps of:
   receiving, from said at least one user equipment, Rx–Tx time difference;
   generating an adjusted Rx–Tx time difference by at least adjusting the received Rx–Tx time difference with one or more time slot periods; and
   determining a distance timing, indicative of the position of said at least one UE, based on the adjusted Rx–Tx time difference.

12. An arrangement in a radio network node for controlling uplink transmission from at least one user equipment to arrive time aligned with a time slot structure at the radio network node, wherein the time slot structure is a sequence of time slots, each time slot having a time slot period, wherein the arrangement comprises:
   a receiving circuit configured to receive from said at least one user equipment a timing uplink transmission;
   a determining circuit configured to determine a timing offset based on the timing uplink transmission, wherein the timing offset is indicative of distance in time between the radio network node and said at least one user equipment, and the arrangement;

a comparing circuit configured to compare the timing offset to a threshold value for determining a timing advance value to be sent to said at least one user equipment, and the comparing circuit is further configured to:

function in an operational mode D1 wherein the comparing circuit is configured to set the timing advance value to the timing offset, when the timing offset is less than the threshold value, wherein a time-aligned uplink transmission from said at least one user equipment is caused to arrive at the radio network node time aligned with a first uplink time slot, and function in an operational mode D2 wherein the comparing circuit is configured to set the timing advance value to the timing offset reduced by one or more time slot periods, when the timing offset is greater than or equal to the threshold value, wherein a time-aligned uplink transmission from said at least one user equipment is caused to arrive at the radio network node time aligned with a second uplink time slot that is later than the first uplink time slot, and the arrangement further comprises:

a sending circuit configured to send to said at least one user equipment the timing advance value.

13. The arrangement according to claim 12, wherein the timing uplink transmission received is a random access preamble that is non-aligned with the time slot structure or a PUSCH transmission that is time-aligned with the time slot structure.

14. The arrangement according to claim 12, wherein the timing advance value is sent in a random access response.

15. The arrangement according to claim 12, wherein said at least one user equipment comprises a first user equipment and a second user equipment, wherein the timing advance value has been set by the comparing circuit according to the operational mode D1 for the first user equipment, and wherein a second timing advance value has been set by the comparing circuit according to the operational mode D2 for the second user equipment, wherein a plurality of consecutive subframes is associated with the time slot structure, each subframe comprising two subsequent time slots of the time slot structure, the arrangement further comprising:

the sending circuit further configured to send in a first and second downlink subframe of said plurality of consecutive subframes a first uplink grant message to the second user equipment and a second uplink grant message to the first user equipment, wherein the second downlink subframe is later than the first downlink subframe; and the receiving circuit further configured to receive in a first uplink subframe the time-aligned uplink transmission from the first user equipment and the time-aligned uplink transmission from the second user equipment.

16. The arrangement according to claim 15, wherein the comparing circuit is further configured to schedule in the first uplink subframe 1) the first user equipment in a first portion of a frequency carrier and 2) the second user equipment in a second portion of the frequency carrier, wherein the first and second portions of the frequency carrier are non-overlapping.

17. The arrangement according to claim 16, wherein the comparing circuit is further configured to schedule in said plurality of consecutive subframes the first user equipment in the first portion of the frequency carrier and the second user equipment in the second portion of the frequency carrier.

18. The arrangement according to claim 17, wherein the first and second portions of the frequency carrier are associated to a first and second set of consecutive subcarriers of the frequency carrier, respectively, wherein the first and second sets of subcarriers are dynamically determined or predetermined.

19. The arrangement according to claim 18, wherein the time-aligned uplink transmission is sent on PUCCH and the step of scheduling further comprises scheduling in the first portion of the frequency carrier only user equipments assigned a timing advance value according to the step D1 and scheduling in the second portion of the frequency carrier only user equipments assigned a timing advance value according to the step D2.

20. The arrangement according to claim 15, wherein the time-aligned uplink transmission from the first user equipment and/or second user equipment comprises information about HARQ feedback or about one or more of SR, CQI, PMI and RI.

21. The arrangement according to claim 14, wherein one FFT is applied to the time-aligned uplink transmissions from the first user equipment and/or second user equipment.

22. The arrangement according to claim 12, further comprising the determining circuit further configured to determine a position of said at least one UE, when the timing advance value of said at least one user equipment has been set by the comparing circuit according to the operational mode D2;

the receiving circuit further configured to receive, from said at least one user equipment, Rx–Tx time difference;

the determining circuit further configured to generate an adjusted Rx–Tx time difference by at least adjusting the received Rx–Tx time difference with one or more time slot periods; and the determining also configured to determine a distance timing, indicative of the position of said at least one UE, based on the adjusted Rx–Tx time difference.

* * * * *